United States Patent
Uhlig et al.

(10) Patent No.: US 8,856,374 B2
(45) Date of Patent: Oct. 7, 2014

(54) METHODS AND SYSTEMS FOR RECONFIGURATION AND REPARTITIONING OF A PARALLEL DISTRIBUTED STREAM PROCESS

(75) Inventors: Volkmar Uhlig, Chicago, IL (US); Jan Stoess, Karlsruhe (DE)

(73) Assignee: HStreaming, Inc., San Francisco, CA (US)

(*) Notice: Subject to any disclaimer, the term of this patent is extended or adjusted under 35 U.S.C. 154(b) by 112 days.

(21) Appl. No.: 13/308,064

(22) Filed: Nov. 30, 2011

(65) Prior Publication Data

US 2012/0137018 A1    May 31, 2012

Related U.S. Application Data

(60) Provisional application No. 61/418,371, filed on Nov. 30, 2010, provisional application No. 61/418,221, filed on Nov. 30, 2010.

(51) Int. Cl.
| | |
|---|---|
| G06F 15/16 | (2006.01) |
| G06F 15/173 | (2006.01) |
| G06F 9/00 | (2006.01) |
| G06F 9/50 | (2006.01) |
| G06F 11/00 | (2006.01) |

(52) U.S. Cl.
CPC ...... *G06F 11/00* (2013.01); *G06F 9/00* (2013.01); *G06F 9/5083* (2013.01); *G06F 11/004* (2013.01)
USPC ............................................ 709/231; 709/223

(58) Field of Classification Search
USPC ........................................ 709/223, 224, 231
See application file for complete search history.

(56) References Cited

U.S. PATENT DOCUMENTS

| | | | |
|---|---|---|---|
| 2008/0168179 A1* | 7/2008 | Gu et al. | 709/231 |
| 2010/0036903 A1* | 2/2010 | Ahmad et al. | 709/202 |
| 2011/0208872 A1* | 8/2011 | Liddell et al. | 709/231 |
| 2013/0047026 A1* | 2/2013 | Szabo et al. | 714/4.11 |

* cited by examiner

*Primary Examiner* — Brian J Gillis
(74) *Attorney, Agent, or Firm* — Carter, DeLuca, Farrell & Schmidt, LLP

(57) ABSTRACT

A method of reconfiguring a stream process in a distributed system includes the initial step of managing a stream process including one or more operators. The one or more operators are communicatively associated with one or more stream targets. The one or more operators use a partition function to determine the routing of messages to the one or more stream targets. The method includes the steps of determining a safe state within the stream process, and configuring a configuration state of the one or more operators during the safe state.

19 Claims, 9 Drawing Sheets

METHODS AND SYSTEMS FOR RECONFIGURATION AND REPARTITIONING OF A PARALLEL DISTRIBUTED STREAM PROCESS

CROSS-REFERENCE TO RELATED APPLICATIONS

This patent application claims priority to, and the benefit of, U.S. Provisional Application Ser. No. 61/418,371 filed on Nov. 30, 2010, entitled "METHOD AND SYSTEM FOR ONLINE RECONFIGURATION AND REPARTITIONING OF A PARALLEL DISTRIBUTED STREAM PROCESS", and U.S. Provisional Application Ser. No. 61/418,221 filed on Nov. 30, 2010, entitled "FAULT-TOLERANT DISTRIBUTED STREAM PROCESSING THROUGH A REVERSE SUBSCRIBER MODEL", the disclosures of which are herein incorporated by reference in their entireties.

BACKGROUND

1. Technical Field

The present disclosure relates to data streaming and, more particularly, to methods and systems for reconfiguration and repartitioning of a parallel distributed stream process.

2. Discussion of Related Art

Distributed computer systems have been widely employed to run jobs on multiple machines or processing nodes, which may be co-located within a single cluster or geographically distributed over wide areas, where some jobs run over long periods of time. In order to scale a job, multiple computers can be connected over a common network to form a cluster. An example of a system and method for large-scale data processing is MapReduce, disclosed in U.S. Pat. No. 7,650,331, entitled "System and method for efficient large-scale data processing". MapReduce is a programming model and library designed to simplify distributed processing of huge datasets on large clusters of computers and largely relieves the programmer from the burden of handling distributed computing tasks such as data distribution, process coordination, fault tolerance, and scaling.

System scalability can be achieved in several ways. In one approach, the process may be broken into a number of operators, which can be chained together in a directed acyclic graph (DAG), such that the input, output and/or execution of one or more operators is dependent on one or more other operators. In another approach, individual operators are partitioned into multiple independently operating units and each operator works on a subset of the data. In this approach, the result of all operators is redistributed to the next set of operators in the computational graph.

During the life time of a job the workload may fluctuate substantially and data may be unevenly distributed between operators. A common approach to address the resource allocation problem is to break the job into a substantially larger number of sub-tasks than available nodes and schedule them in priority order. Long running jobs may be interspersed with shorter jobs thereby minimizing overall execution time. A number of algorithms to achieve efficient job scheduling with different performance and efficiency objectives have been researched and published.

In a stream processing system with a distributed computational model, data constantly flows from one or more input sources through a set of operators (e.g., filters, aggregates, and correlations), which are usually identified by a network name in the cluster, to one or more output sinks. The individual operators generally produce result sets that are either sent to applications or other nodes for additional processing. In general, the output of an operator can branch to multiple downstream operators and can be combined by operators with multiple inputs. This form of computation and data transport is called a stream. Commonly, due to low-latency communication requirements in a stream process, the individual operators in the stream are long lived. Once the operators are instantiated on a node, and after the network connections have been established, the job configuration typically stays fixed except in cases of hardware and/or software failures.

In a stream process, fixed job configurations generally lead to sub-optimal resource utilization. Commonly the system designer will provision the system for the peak load situation, and during non-peak times the system will be underutilized. An alternative approach which may avoid overprovisioning is to use a virtual machine environment and compress the virtual worker machines onto fewer physical nodes, thereby freeing up the physical resources. In conventional stream processing methods, it is generally assumed that once a network connection between operators has been established, the flow configuration remains static.

SUMMARY

According to one aspect, a method of reconfiguring a stream process in a distributed system is provided. The method includes the initial step of managing a stream process including one or more operators. The one or more operators are communicatively associated with one or more stream targets. The one or more operators use a partition function to determine the routing of messages to the one or more stream targets. The method includes the steps of determining a safe state within the stream process, and configuring a configuration state of the one or more operators during the safe state.

According to a further aspect, a method for management of a stream processing system is provided. The method includes the initial step of managing a stream process in a distributed system. The stream process includes one or more operators. The one or more operators include an operator dataflow and a configuration state of the operator dataflow. The method includes the steps of determining a safe state within the stream process, and configuring the configuration state of the operator dataflow during the safe state.

BRIEF DESCRIPTION OF THE DRAWINGS

Objects and features of the presently-disclosed methods and systems for reconfiguration and repartitioning of a parallel distributed stream process will become apparent to those of ordinary skill in the art when descriptions of various embodiments thereof are read with reference to the accompanying drawings, of which.

DETAILED DESCRIPTION

Figure 1:
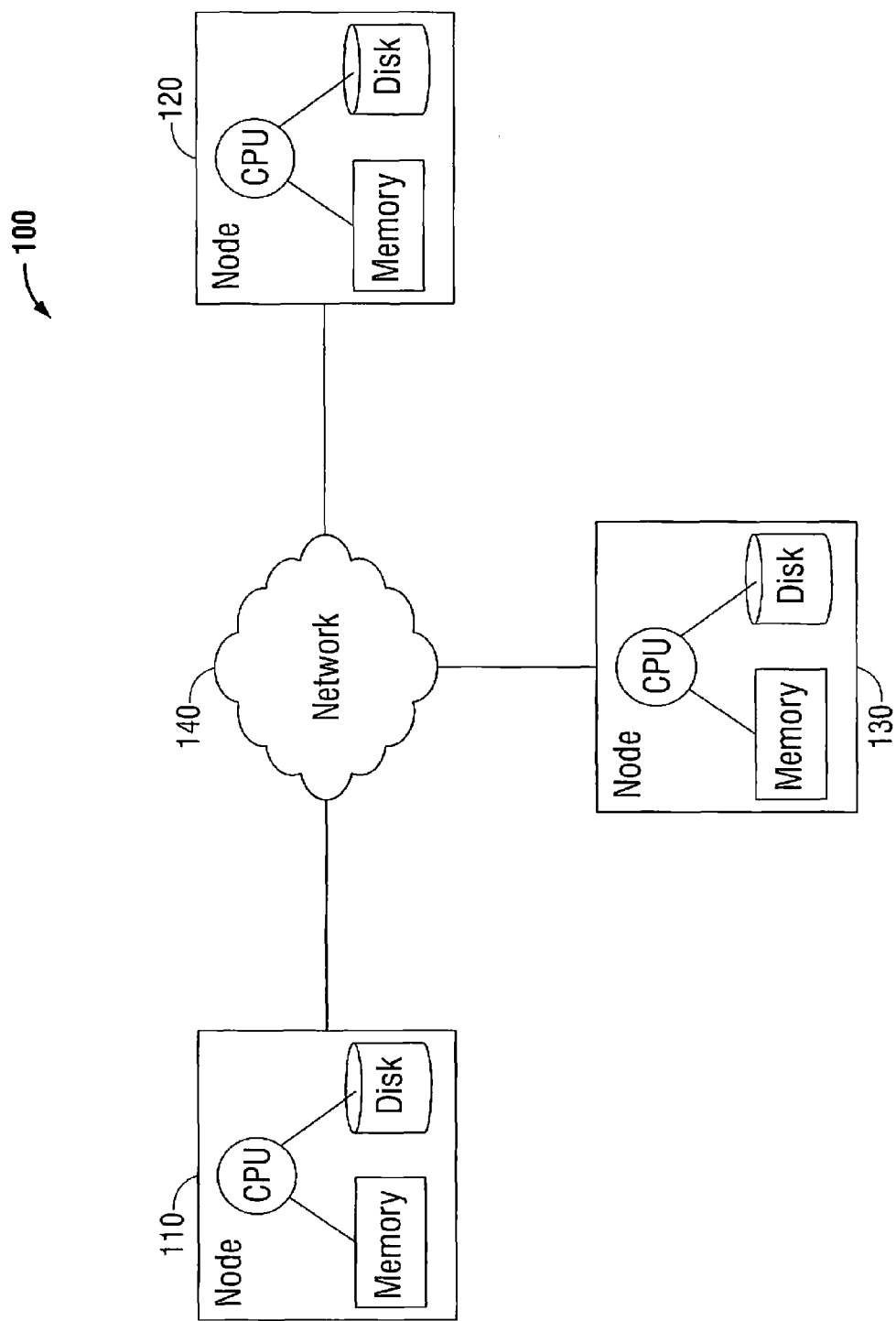
FIG. 1 is schematic representation of a stream processing system in accordance with an embodiment of the present disclosure.

Hereinafter, embodiments of the presently-disclosed methods and systems for reconfiguration and repartitioning of a parallel distributed stream process are described with reference to the accompanying drawings. Like reference numerals may refer to similar or identical elements throughout the description of the figures. This description may use the phrases "in an embodiment," "in embodiments," "in some embodiments," or "in other embodiments," which may each refer to one or more of the same or different embodiments in accordance with the present disclosure.

As it is used herein, the term "computer" generally refers to anything that transforms information in a purposeful way. For the purposes of this description, the terms "software" and "code" should be interpreted as being applicable to software, firmware, or a combination of software and firmware. For the purposes of this description, "non-transitory" computer-readable media include all computer-readable media, with the sole exception being a transitory, propagating signal.

As it is used in this description, "batch" generally refers to a non-dividable unit of data. A batch may contain no data (an empty batch), a single datum or many data elements. Each batch in a stream may be assigned an identifier that uniquely names it within the stream. For purposes of illustration only, in the embodiments described herein, it is assumed that the values of batch identifiers in a stream are monotonically increasing. In alternative embodiments not shown the values of batch identifiers may be monotonically decreasing. In general, the values of batch identifiers may be realized as monotonically increasing or decreasing functions of some algorithm-dependent ordering. It is to be understood that the values of batch identifiers may be ordered in any suitable way.

As it is used in this description, the term "reconfiguration" generally refers to "online reconfiguration". For the purposes herein, "online reconfiguration" generally refers to reconfiguration of the stream process while it is active or running, e.g., the operators are connected over the network and individual operators may have accumulated state.

For purposes of illustration only, in the embodiments described herein, it is assumed that the operators in a stream process exchange messages over the network to transport data and/or information, e.g., stream data, metadata, configuration information, sender addresses and/or receiver addresses, etc. A message may span multiple network packets.

Various embodiments of the present disclosure provide a method and system for online reconfiguration and repartitioning of a parallel distributed stream process. Various embodiments of the present disclosure provide a method of reconfiguring one or more connections of a running data flow, and may preserve the semantics and correctness of the stream process and/or may provide the ability to restart individual operators in the face of failures (node failures, network failures, etc) and/or network partitions.

Various embodiments of the present disclosure provide methods for dynamically reconfiguring parameters of an operator in a stream process and/or for dynamically reconfiguring the layout and connections of a stream process with minimal or no disruption of the data flow. Various embodiments of the present disclosure provide methods for dynamically changing the stream configuration. The presently-disclosed methods of online reconfiguration and repartitioning of a parallel distributed stream process may preserve fault tolerance and/or restartability of the stream process. Although the following description describes methods of online reconfiguration and repartitioning of a parallel distributed stream process, the teachings of the present disclosure may also apply to reconfiguration and/or repartitioning of any stream-like process, e.g., to ensure that the system parts that interact with entities under reconfiguration do not fail or exhibit non-deterministic behavior because of reconfiguration.

In accordance with various embodiments of the present disclosure, restartability may be achieved by buffering computed data in upstream operators until it is safe to discard the data. In a stream process organized as a directed acyclic graph (DAG) in accordance with the present disclosure, it is safe to discard buffered data after the result of directly or indirectly dependent computation on data (and/or data transformation, etc.) has been successfully delivered to all data sinks outside of the stream process. After successful delivery of the output result, or portion thereof, downstream operators may send a commit message about the successful processing and delivery upstream. After successful delivery and/or receipt of a commit message, each of the upstream operators can safely discard the buffered data and further commit processing to its own upstream operators. In the some embodiments, where partial results may be acceptable and/or desirable, buffered data may be discarded without receipt of a commit message.

In some embodiments of the present disclosure, when the operator has received all commits, the operator sends a commit to all upstream subscriptions for that particular stream, and may take its window size into account. The presently-disclosed chained buffering-and-commit approach ensures that intermediate data is always available, e.g., in case of a failure of any of the operators, and/or allows each downstream operator to re-create its input data set to resume the stream at the point of failure.

In some embodiments of the present disclosure, an operator in stream-based processes may be connected to one or more stream input sources and/or one or more stream output sinks. In some embodiments of the present disclosure, an operator in stream-based processes may include an operator function performing a transformation on the input data, and/or may include a partition function that determines to which stream targets (e.g., operators and/or data sinks) to route the data.

The presently-disclosed methods may treat the configuration of a stream as a fundamental element of the stream. In some embodiments, the stream configuration is multiplexed into the actual data stream, and the partitioning function and/or operator configurations may be changed during the period between two consecutive batches (also referred to herein as the "quiescence period") whereby the overall system configuration remains consistent, e.g., to preserve correctness, to ensure the reliability of the system, and/or to ensure that the system parts that interact with entities under reconfiguration do not fail because of reconfiguration.

In accordance with various embodiments of the present disclosure, the stream system configuration and the data stream become an integral undividable part and a single error recovery mechanism for data and configuration can be used to restore the system in case of a failure. In some embodiments, all or substantially all standard mechanisms in the stream processing system remain unchanged.

FIG. 1 shows a schematic representation of a stream processing system (shown generally as 100) in accordance with an embodiment of the present disclosure that includes a plurality of computer nodes 110, 120 and 130 interconnected by a network 140. Each node 110, 120 and 130 may include one or more central processing units (CPUs), which may be coupled to memory and/or one or more disks or other storage. CPUs may include any type of computing device, computational circuit, or any type of processor or processing circuit capable of executing a series of instructions that are stored in a memory. CPUs may be adapted to run an operating system platform and application programs. Nodes may communicate with other nodes over the network (also referred to herein as the "interconnect"), which may be Ethernet or other computer networking technologies. Nodes execute operators of one or more stream processes which may be instantiated as a standard process. Memory may be random access memory (RAM), or any other form of memory, e.g., flash, static RAM (SRAM), dynamic RAM (DRAM), ROM (read-only memory), MRAM (magnetoresistive random access memory), EPROM or E2PROM.

Figure 2:
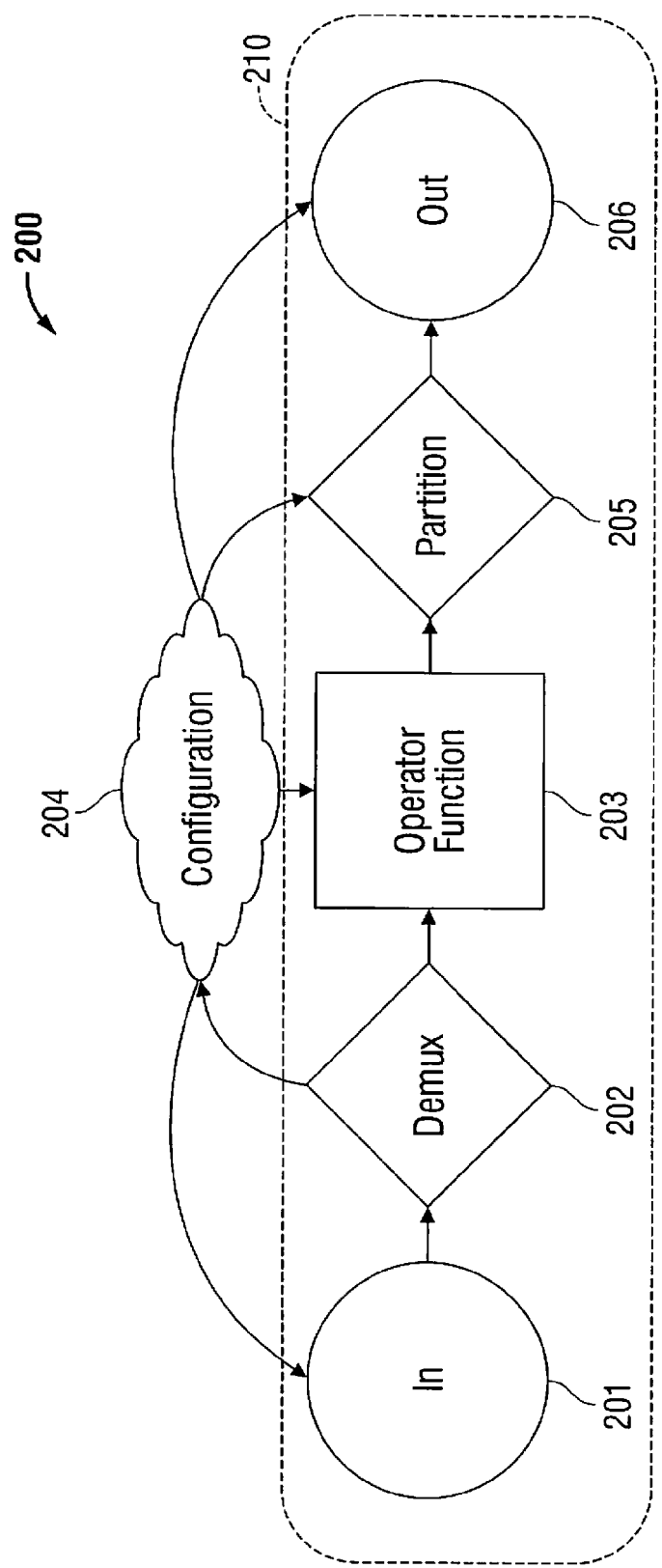
FIG. 2 is schematic representation of an operator in a stream processing application in accordance with an embodiment of the present disclosure.

FIG. 2 shows a schematic representation of an operator (shown generally as 200) for use in a stream processing application according to an embodiment of the present disclosure. Operator 200 includes an operator dataflow 210 and the configuration state 204 of the operator dataflow 210. Operator dataflow 210 includes an input connector 201 for receiving messages from other operators or a source external to the stream (not shown in FIG. 2), a de-multiplexer 202, a operator function 203 which performs the data transformation and/or computation, and an output connector 206 to send messages to other operators (not shown in FIG. 2). In some embodiments, the operator dataflow 210 may include a partition function 205 for message routing.

A stream may include one or more operators which receive data from one or more other operators and/or from a source external to the stream, and which perform a data transformation and/or computation over a "batch window" (e.g., spanning one or more batches) and may send the result of the data transformation and/or computation to one or more operators and/or one or more sinks external to the stream process. Each batch window may be assigned a unique identifier. Batch identifiers may be generated by any suitable method. In some embodiments, each batch window may be assigned a unique identifier which is derived from the smallest batch identifier covered by the window.

Operators may depend on one or more input streams to perform an operation. For purposes of illustration only, in the embodiments described herein, it is assumed that an operator identifies correlated events in multiple streams by an identical batch ID. An operator may perform a data transformation and/or computation over the input batch window after some or all batches from some or all input streams have arrived, and may generate an output result. In some cases, an operator may start a data transformation and/or computation over the input batch window before all batches have arrived. In cases where an output result is generated, the output result is typically forwarded to one or more downstream operators and/or sink(s). The operator may assign a new batch ID for the output batch or can re-use the batch window ID (in the following, for ease of explanation, it is assumed that the batch ID remains the same).

An operator (e.g., 200 shown in FIG. 2) may include an input connector 201, e.g., to receive data from one or more operators and/or from one or more external sources, a de-multiplexer 202, e.g., for use to divide a combined data stream into sub-streams, an operator function 203, e.g., to perform the data transformation and/or computation, the configuration state 204 for the processed batch, a partitioning function 205, e.g., to determine to which downstream operators the data should be forwarded, and an output connector 206, e.g., to forward the data to downstream operators' input connectors and/or to one or more external data sinks.

A stream process which divides the stream into individual batches generally has a well-defined clock cycle. In some embodiments, wherein a stream process has a common clock cycle, all operators reach a well-defined recoverable state at the end of the clock cycle. In some embodiments, where the stream process has different clock cycles for data streams between operators, reconfiguration may take place on a super cycle or reconfiguration may take place on only those operators that have a common clock cycle. At well-defined synchronization points, all operators can be reconfigured in a synchronized and consistent way. For systems with differently clocked data streams, reconfigurations may take place on a super cycle or reconfiguration may take place on those operators that have a common clock cycle. In an illustrative, non-limiting example, a stream process may process data coming from two different data sources, one clocked with a frequency of new data arriving every 5 seconds, and the second stream with data arriving every 8 seconds. In this example, while both sub-streams have different clock cycles, both sub-streams have a super cycle every 40 seconds, which is the smallest common denominator of 5 seconds and 8 seconds. When both sub-streams are in sync, the stream process can be safely reconfigured. In some cases, when it is not possible or impractical to find a super cycle, a stream processing system may introduce a synthetic synchronization cycle for the purpose of reconfiguration.

Figure 3:
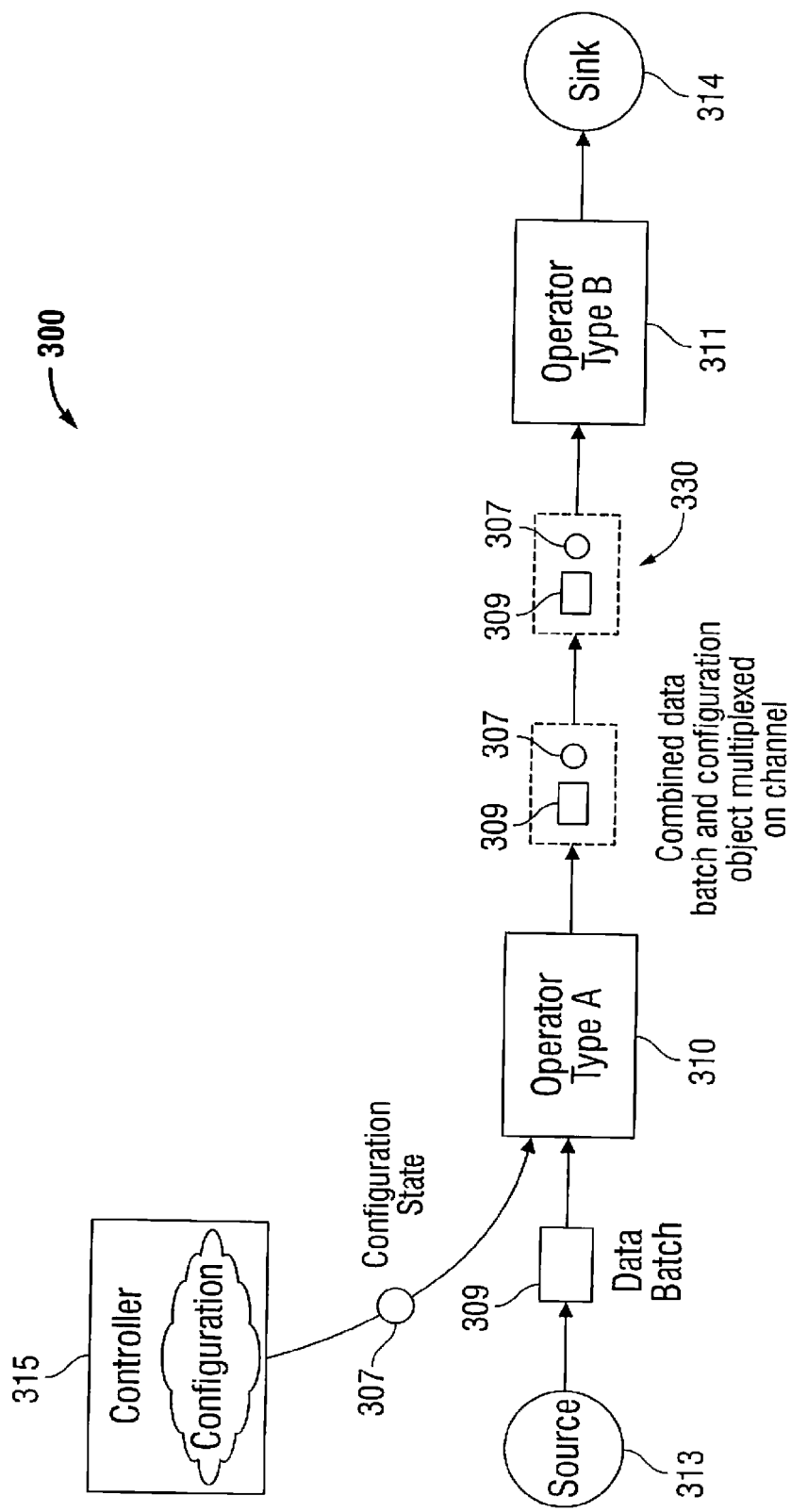
FIG. 3 schematically illustrates a stream process in accordance with an embodiment of the present disclosure.

FIG. 3 schematically illustrates a stream process (shown generally as 300) in accordance with an embodiment of the present disclosure. For purposes of illustration only, in the embodiment illustrated in FIG. 3, stream process 300 includes two operators, i.e., operator 310 of type A and operator 311 of type B.

As shown in FIG. 3, the stream process 300 contains a controller process 315, a data source 313 and a data sink 314. Stream process 300 includes a controller process 315 which may serve as an additional data source to all operators which are connected to one or more external data sources. Controller process 315 may serve as a stream data source providing the configuration stream. Data source 313 may be configured to provide data on a regular basis, and may be any source of streaming data or polled data. Streaming or polled data may be provided in form of data batches 309. Data sink 314 may be any entity that consumes the output result, or portion thereof, of the stream process.

The configuration stream is similarly clocked as data stream and has associated batch IDs. With each clock cycle the batch IDs change in a monotonically increasing or decreasing fashion. The data items in the configuration stream consist of stream-wide configuration parameters covering all operators and connections in the stream. In some embodiments, multiple configuration streams may be employed and/or the configuration data items may only cover parts of the stream process. In some embodiments, as shown in FIG. 3, each operator forwards the configuration stream to all outbound connections (e.g., downstream operator and/or sinks) multiplexed with other data elements. Operators 310 and 311 may receive input from multiple data sources, and may receive the same configuration state multiple times. It may be considered an error if the received configuration states differ from one another and/or may contain conflicting configuration state. In some embodiments, multiple operators may subscribe to the configuration stream directly, e.g., instead of receiving the configuration state through the multiplexed in-bound stream.

Figure 4:
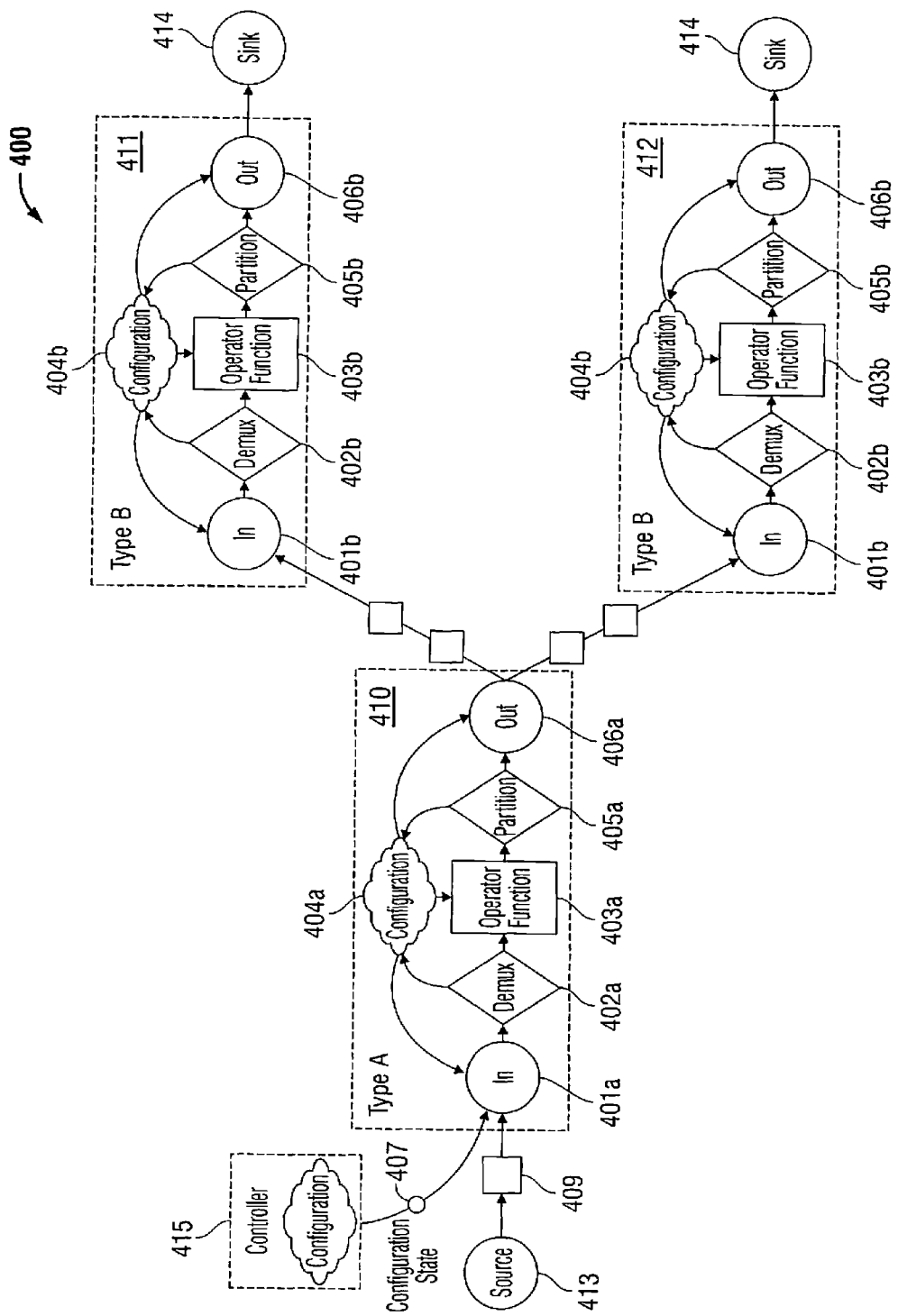
FIG. 4 schematically illustrates a stream process in accordance with another embodiment of the present disclosure.

FIG. 4 schematically illustrates a stream process (shown generally as 400) in accordance with an embodiment of the present disclosure. For purposes of illustration only, in the embodiment illustrated in FIG. 4, stream process 400 includes one instance of an operator of type A (operator 410) and two instances of an operator of type B (operators 411 and 412). Operator 410 generally includes an inbound connector 401a, a de-multiplexer 402a, an operator function 403a which performs the data transformation and/or computation, and an output connector 406a. In some embodiments, the operator 410 includes a configuration module 404a, and may include a partition function 405a for message routing. Operators 411 and 412 generally include an inbound connector 401b, a de-multiplexer 402b, an operator function 403b which performs the data transformation and/or computation, and an output connector 406b. In some embodiments, the operators 411 and 412 include a configuration module 404a, and may include a partition function 405b for message routing.

In some embodiments, as shown in FIG. 4, the configuration state 407 may be multiplexed with one or more data streams into one or more combined streams. Following the reception of a batch 409, the demultiplexer 402a of operator 410 de-multiplexes the data stream delivered by the source 413 and the configuration state 407 delivered by the controller 415, processes the data stream through the operator 403a and forwards the configuration stream to an in-operator configuration module 404a as depicted in FIG. 4. The configuration module 404a updates configuration parameters for the inbound connector 401a, the operator function 403a, the partition function 405a and/or the outbound connector 406a. In order to preserve consistency across the cluster, the reconfiguration should take place either before or after a batch is processed and the operator is in a safe state. Depending on the type of update, each of the listed elements may need to take different actions, e.g., inbound connectors may have to subscribe to different data sources, operators may have to change internal state and/or may have to read a different data set, partition functions may have to update their internal state and tables, and the outbound connectors may have to wait for, or drop, connections to the next operator.

In some embodiments, the stream topology does not change but only the internal state of an operator is modified. A name may be introduced for each operator in the system such that it is possible to identify the operator in the configuration state. As an illustrative, non-limiting example, an operator implements a keyword-based filter function and counts the number of elements which pass the filter, wherein the configuration stream contains an identifier for the operator and the list of keywords that should be filtered.

It is safe to reconfigure operators during the "quiescence period" which may be defined as the period between two consecutive batches. In some embodiments, as shown in FIG. 4, each batch can be considered an individual sub-computation having a well-defined start point and end point, where the internal state (e.g., the counter) will be reset between two consecutive batches and the list of filter keywords can be updated at this point without having data leak between batch instances.

Stream processes may be long-running processes, potentially over days, weeks or months. The stream volume may fluctuate over time. In some embodiments, in order to avoid provisioning for the highest possible data volume, the number of instances of each parallel operator may be adjusted depending on the current workload.

Hereinafter, methods in accordance with the present disclosure are described in which an operator can be added and removed from the stream without disrupting the data flow. Any suitable mechanisms and algorithms for deciding when to adjust the number of operators may be used.

Figure 5:
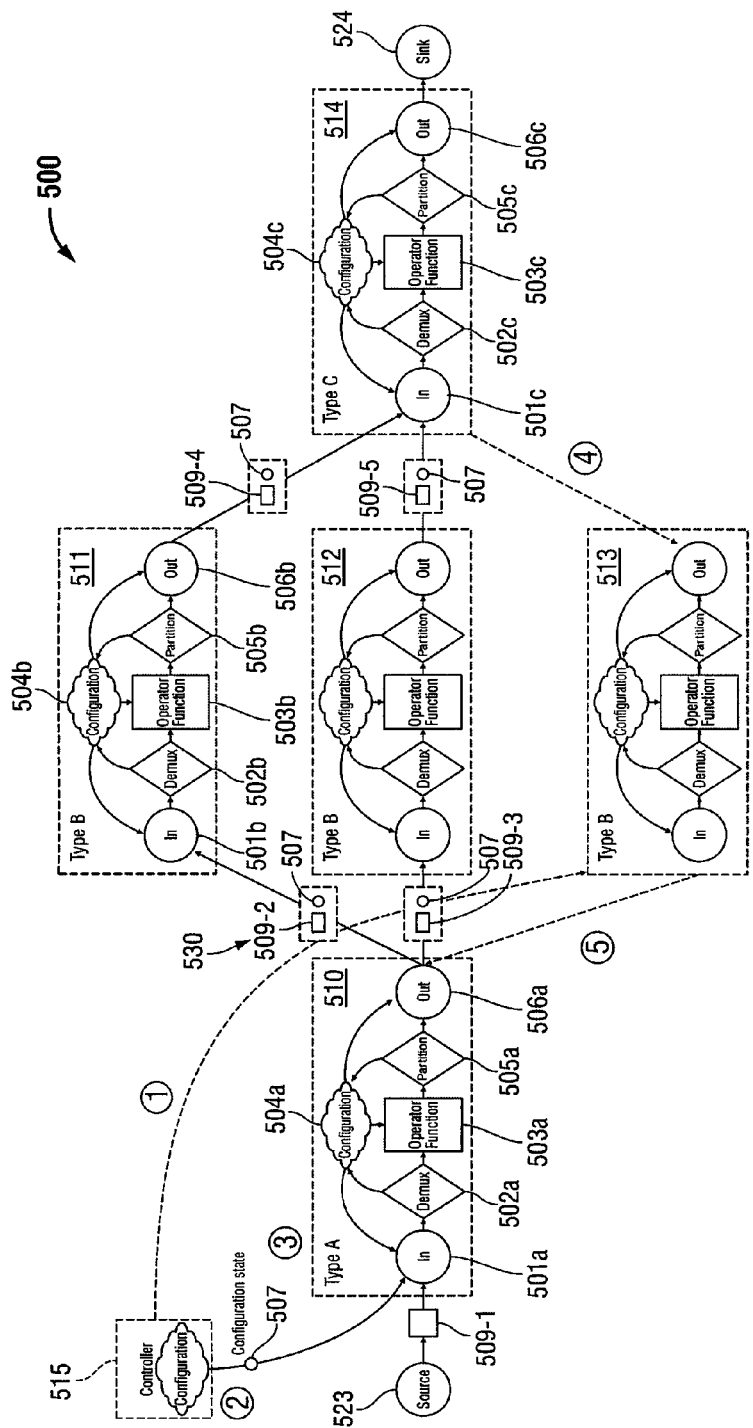
FIG. 5 schematically illustrates a method of adding a new operator into a running stream process in accordance with an embodiment of the present disclosure.

FIG. 5 schematically illustrates a method of adding a new operator into a running stream process (shown generally as 500) in accordance with an embodiment of the present disclosure. For purposes of illustration only, in the embodiment illustrated in FIG. 5, stream process 500 includes three types of operators, i.e., operator 510 of type A, operator 511, 512, and 513 of type B, and operator 514 of type C. Stream process 500 includes one active instance of operator type A (operator 510), two active instances of type B (operators 511 and 512) and one active instance of type C (operator 514).

In some embodiments, as shown in FIG. 5, one or more operators of one or more types (e.g., operator 510 of type A, operator 511, 512, and 513 of type B, and operator 514 of type C shown in FIG. 5) may each include an inbound connector (501a, 501b and 501c, respectively), a de-multiplexer (502a, 502b and 502c, respectively), an operator function (503a, 503b and 503c, respectively) which performs the data transformation and/or computation, a partition function (505a, 505b and 505c, respectively) for message routing, and/or an output connector (506a, 506b and 506c, respectively).

At some point, a controller process 515 may decide and/or may receive a request to increase the parallelism of operator type B from two active instances to three active instances, e.g., by adding another instance of operator type B (operator 513). In accordance with an embodiment of the present disclosure, as shown in FIG. 5, a method of performing the integration includes the steps described hereinbelow.

In step 1, the controller process launches a new instance of operator type B (operator 513 shown in FIG. 5) in the cluster and waits until the operator 513 has successfully launched and reported availability.

In step 2, the controller updates the configuration and adds operator 513 of type B into the stream. The new configuration updates the partition function 505a of operator 510 from two partitions to three partitions, it updates the outbound connector 506a of operator 510 to wait for three downstream subscriptions instead of two, and it updates the inbound connector 501c of operator 514 of type C to subscribe to operators 511, 512 and 513. The controller then sends the updated configuration state 507 in the configuration stream to operator 510.

In step 3, the operator 510 of type A receives the new configuration state 507 from the configuration stream and data batch 509-1 from source 523. After completing the operator function, operator 510 combines the result sets 509-2 and 509-3 with configuration state 507 into data stream 530 and forwards the result sets to operators 511 and 512 Operator 510 then updates its partition function 505a and the outbound connector 506a. In an alternative embodiment, the operator 510 receives the new configuration state 507 and data batch 509-1 and before completing the operator function and forwarding the result set 509-2 and 509-3 to operators 511 and 512 respectively, operator 510 updates its partition function 505a and the outbound connector 506a. Operator 510 forwards the new configuration state 507 to operators 511 and 512 as part of the data stream 530. The new configuration of the outbound connector of operator 510 now requires three subscriptions, and operator 510 will not continue forwarding batches until a third connection from an operator 513 has been established. Since there is no modification to the configuration of operators 511 and 512, both operators 511 and 512 generate the result sets as normally and each forward the result (509-4 and 509-5, respectively) and the new configuration state 507 to operator 514.

In step 4, the operator 514 of type C applies the new configuration state to its inbound connector 501c and subscribes to the new operator 513 of type B.

In step 5, operator 513 of type B receives the subscription from operator 514 and operator 513 of type B subscribes to operator 510 of type A. When the connection has been established for all operators, operator 510 will start sending the new batch data partitioned according to the new partition function to all three operators of type B (operators 511, 512 and 513).

Figure 6:
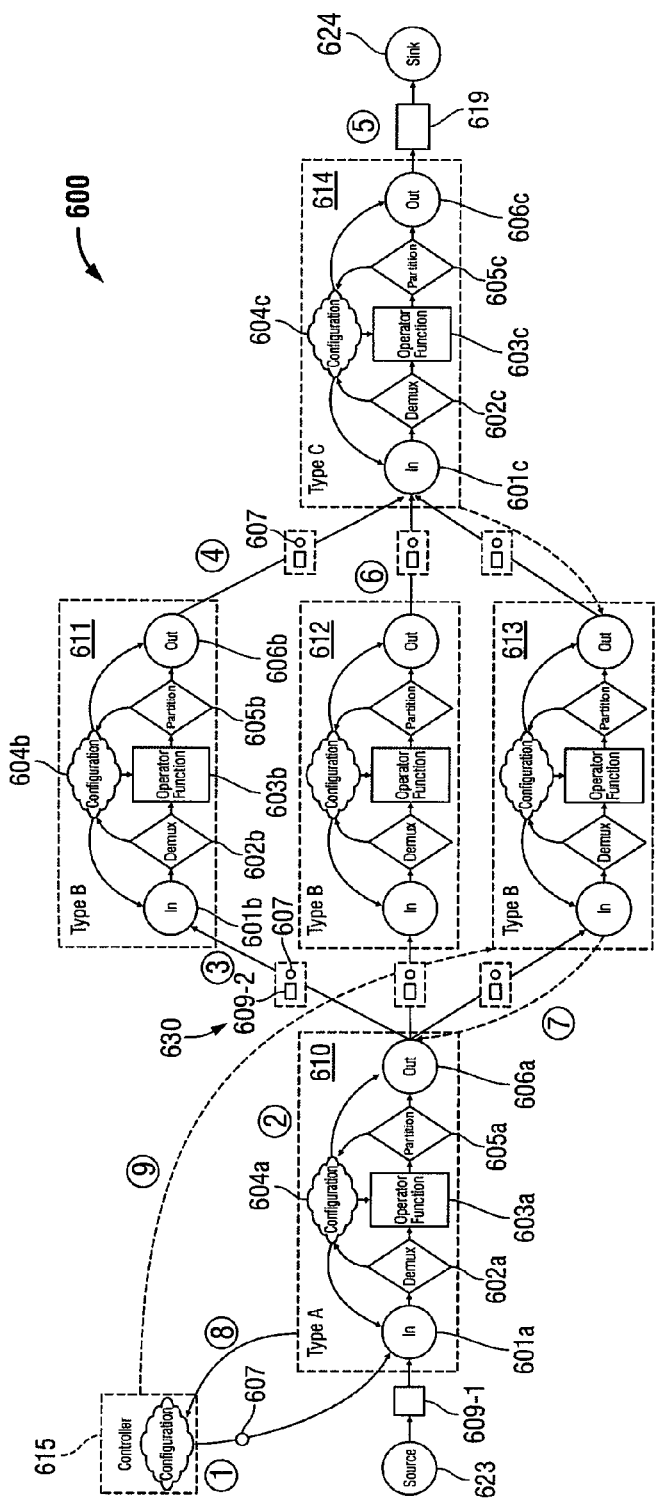
FIG. 6 schematically illustrates a method of removing an operator from a running stream process in accordance with an embodiment of the present disclosure.

FIG. 6 schematically illustrates a method of removing an operator from a running stream process in accordance with an embodiment of the present disclosure. FIG. 6 depicts the "inverse" function of FIG. 5, i.e., the shutdown of a active operator in a stream process, in this embodiment, operator 613. The stream (shown generally as 600) includes one or more types of operators, e.g., three operator types A, B, and C. For purposes of illustration only, in the embodiment illustrated in FIG. 6, stream process 600 includes one instance of operator type A (operator 610), three instances of operator type B (operators 611, 612 and 613), and one instance of operator type C (operator 614).

In some embodiments, as shown in FIG. 6, one or more operators of one or more types (e.g., operator 610 of type A, operators 611, 612, and 613 of type B, and operator 614 of type C shown in FIG. 6) may each include an inbound connector (601a, 601b and 601c, respectively), a de-multiplexer (602a, 602b and 602c, respectively), an operator function (603a, 603b and 603c, respectively) which performs the data transformation and/or computation, a partition function (605a, 605b and 605c, respectively) for message routing, and/or an output connector (606a, 606b and 606c, respectively).

At one point the controller process 615 decides and/or may receive a request to decrease the parallelism of operator type B from three operator instantiations to two operator instantiations, e.g., by shutting down operator 613. In accordance with an embodiment of the present disclosure, as shown in FIG. 6, a method of performing the shut-down of the operator includes the steps described hereinbelow.

In step 1, the controller updates the stream configuration such that it de-activates all data flow through operator 613 and marks operator 613 as inactive. The controller updates the partition function 605a of operator 610 of type A from three partitions to two, it updates the outbound connector 606a of the operator 610 from three connections to two, and operator C's inbound connector 601c from three connections to two. The controller 615 then sends the new configuration state 607 into the configuration stream to operator 610.

In step 2, operator 610 receives batch 609-1 from the data stream from source 623 and the configuration state 607 from the configuration stream from controller 615. The operator de-multiplexes both streams, generates the result set according to the old operator configuration state. Operator 610 then sends the result sets (e.g., 609-2) and the new configuration state 607 using a combined batch 630 to downstream operators 611, 612, and 613.

In step 3, operator 610 of type A updates its partition function 605a from three to two partitions. It also marks the outbound connector 606a that it requires two subscriptions instead of three.

In step 4, all operators of type B (e.g., operators 611, 612 and 613 shown in FIG. 6) forward the generated results and the new configuration state to operator 614 of type C.

In step 5, operator 614 forwards the result to the sink 624. At this point all data of the batch has been successfully delivered and operator 613 can be safely shut down. In some embodiments, e.g., a system where recoverability in case of a failure is not required, the operator 613 can be safely shut down once the data traversed to the next downstream operator (e.g., operator 614).

In step 6, operator 614 acknowledges the successful processing of the batch by sending a commit message to operators 611, 612 and 613. Operator 614 then reconfigures the inbound connector 601c and unsubscribes from operator 613.

In step 7, operators 611, 612 and 613 acknowledge successful processing of the batch by sending a commit message to operator 610. Operator 613 then unsubscribes from operator 610.

In step 8, operator 610 acknowledges successful processing of the batch by sending a commit message to the controller 615. This final acknowledgement notifies the controller that operator 613 has been removed from the stream and it is now safe to shut it down.

In step 9, the controller shuts down operator 613 and frees up the resources in the system. In some embodiments, operator 613 may shut down by itself after step 7 or step 8.

Generally, in a parallel stream processing system, all operators use the same configuration data. Once the configuration data is in the stream system and tagged with a batch ID, reliable transport and replay mechanisms ensures consistent delivery to all operators. As described below, various embodiments of the present disclosure handle how configuration data is injected at source operators.

In one embodiment, the configuration stream is treated as a clocked data stream and on each clock cycle provides either the old or the new configuration state to the first set of stream operators. An optimization, in accordance with an embodiment of the present disclosure, is to transmit only deltas between the old configuration state and the new configuration state once the configuration state change. In some embodiments, the configuration stream may be clocked at a different rate than data streams reducing the number of messages crossing the network.

In another embodiment, a two-phase commit protocol may be employed where all operators first receive an updated configuration from the configuration manager for a particular batch ID in the future. The operators hold off forwarding any data packets until the second phase of the commit has been completed.

In some embodiments, all operations are executed independently of any batches before or after the current batch, each batch ID is independent, and data transformations and/or computations are side-effect free. One operation in a stream processing system in accordance with the present disclosure involves a sliding window over a number of batches. In an illustrative, non-limiting example, each batch may span the time period of one second while an operation may be performed over a time window of one minute containing 60 seconds worth of batches, i.e., 60 independent batches. With each tick, the sliding window moves by one batch. The oldest batch is removed from the sliding window and a new batch is added to the sliding window.

Figure 7:
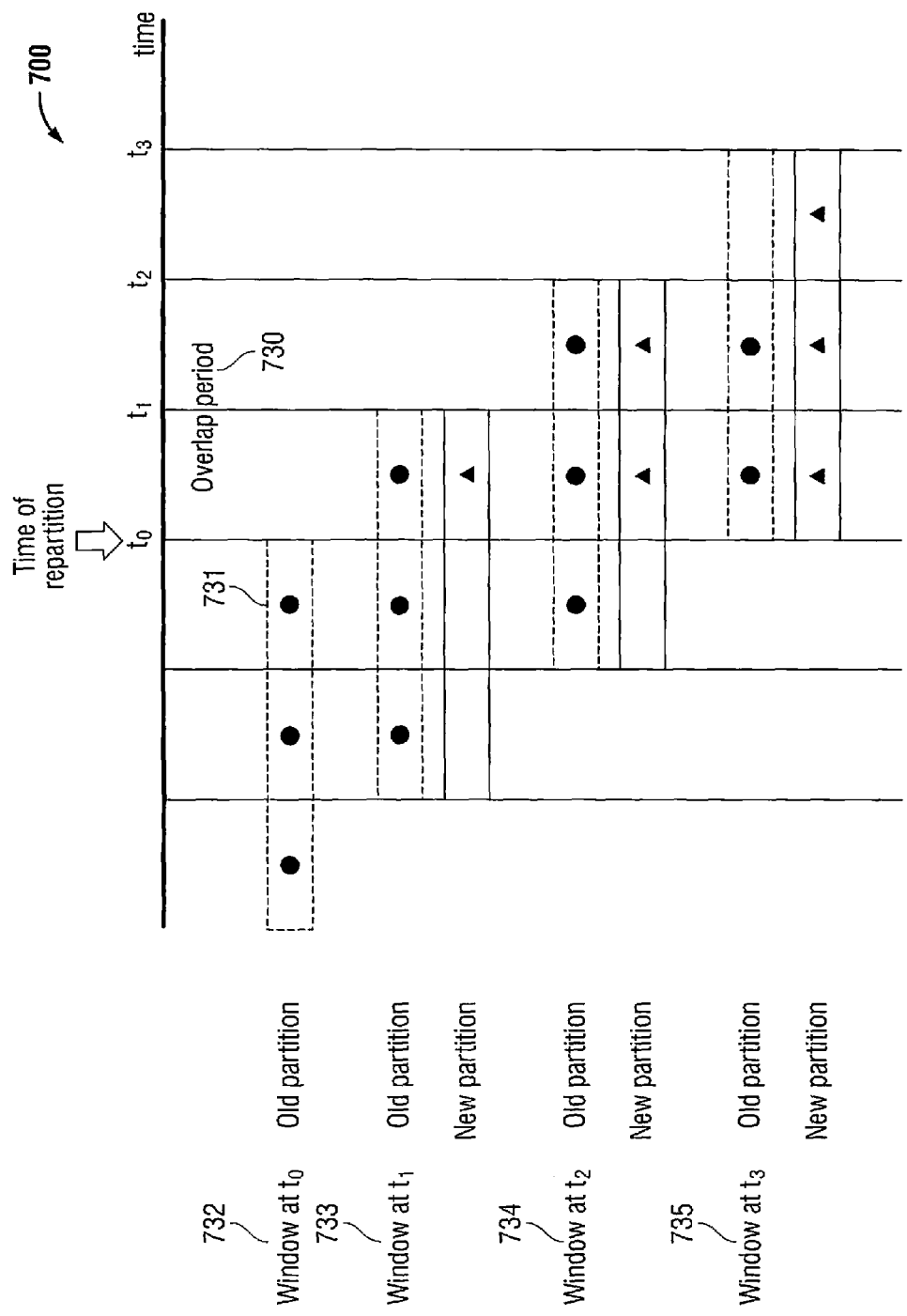
FIG. 7 schematically illustrates the progression of re-partitioning of an operator in a stream process which computes over a time window in accordance with an embodiment of the present disclosure.

FIG. 7 schematically illustrates the progression of re-partitioning of an operator in a stream process which computes over a sliding window of batches in accordance with an embodiment of the present disclosure. In the following description, the time of configuration change is denoted as t and the windows size as w. When reconfiguring a sliding-window operator in a streaming system, the sliding window spans multiple batches including the safe points between batches, and there is no single point in time where the configuration changes from the old to the new setting. Rather, there is an overlap of batches of size w−1 where the system needs to compute the data set according to the old configuration state and according to the new configuration state in order to generate consistent results. After w−1 ticks the stream system can disable the old configuration and only use the new configuration.

For purposes of illustration only, in the embodiment illustrated in FIG. 7, the sliding window of an operator includes three batches (w=3). At time $t_0$ (window 732), the operator's partition function is modified from an old partitioning function to a new partitioning function. At times $t_1$ (window 733) and $t_2$ (window 734) the operator partitions the data set according to both, the old and the new, partition function as specified in the old and new configuration state. At time $t_3$ (window 735), the operator accumulated enough batches to span a complete three-element window over the data partitioned according to the new partition function and disables the old partition function.

Stream processing systems use partition functions to parallelize and distribute workload between multiple downstream operators. The partition function determines which node processes which piece of data and is usually computed by a hash function of a data key chosen from the input set modulo the number of downstream nodes.

When the partition function changes, then the distribution of keys will change and downstream nodes may receive different data set distribution before and after the partition function reconfiguration. For a windowed stream which depends on keys being distributed deterministically using existing methods such reconfiguration would yield incorrect results.

In the above-described approach, the operator could run the old and the new partitioning function and transmit the data once according to each partition function. However, running the old and the new partitioning function and transmitting the data once according to each partition function may double the amount of data that needs to be transmitted over the network. In stream processing systems, network bandwidth is a limited resource and oftentimes a bottleneck. An optimization to reduce data duplication, in accordance with the present disclosure, is described below.

For each data element, the sender computes a partition key according to the old and the new partition function. If the result (i.e., the target operator identifier) of the partition function is the same, then the data is sent only once to that target operator. If the two computed partitions are different then the data is sent to each target operator. In the receiving operator, the inbound data stream is treated as a unified stream; however, before computing/transforming the windowed data by the operator function, the partition function is re-applied as a filter. For all batch IDs which are before batch t+w−1 the filter removes those elements which do not match the old partition function. For all batches on and after point t+w−1 the filter applies the new partition function and removes those items which do not match the new partition function. The filter function may be realized as part of the de-multiplexer step inside the operator.

Using the above-described optimization, the stream processing system does not need to double buffer the data for different partition functions during the switch over period. Using the above-described optimization, the stream processing system handles a single stream between operators, which may substantially reduce the complexity of the implementation. Using the above-described optimization, during error recovery in the middle of a switch-over from an old to a new partition function, the system does not need special case the implementation. Using the above-described optimization (e.g., assuming a random distribution of keys in the partition space) the percentage of overlap in the partition space for two partition functions is high, and thus merging and filtering the results of the partition function may substantially reduce network traffic in a cluster for the period of double partitioning.

Hereinafter, a method of reconfiguring a stream process in a distributed system in accordance with the present disclosure is described with reference to FIG. 8 and a method for management of a stream processing system in accordance with the present disclosure is described with reference to FIG. 9. It is to be understood that the steps of the methods provided herein may be performed in combination and in a different order than presented herein without departing from the scope of the disclosure. Embodiments of the presently-disclosed method of reconfiguring a stream process in a distributed system and method for management of a stream processing system may be implemented as a computer process, a computing system or as an article of manufacture such as a pre-recorded disk or other similar computer program product or computer-readable media. The computer program product may be a non-transitory, computer-readable storage media, readable by a computer system and encoding a computer program of instructions for executing a computer process.

Figure 8:
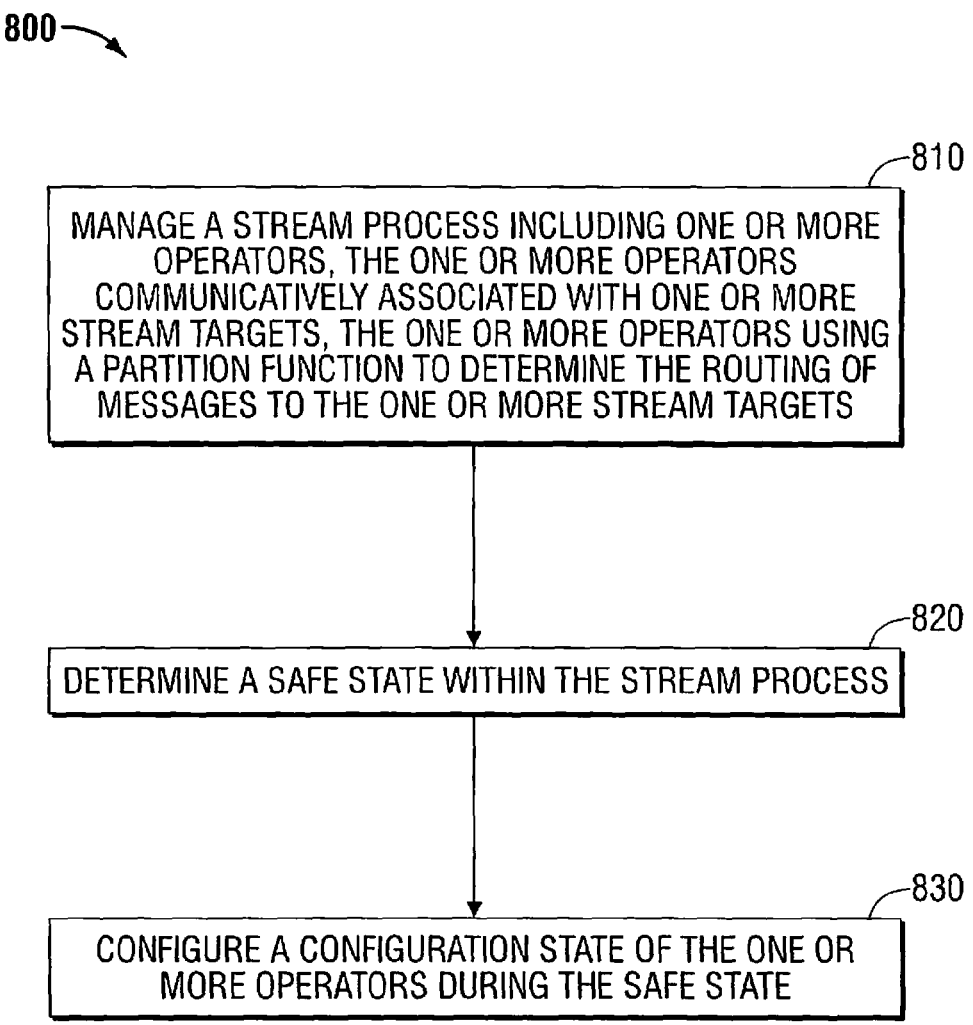
FIG. 8 is a flowchart illustrating a method of reconfiguring a stream process in a distributed system in accordance with an embodiment of the present disclosure.

FIG. 8 is a flowchart illustrating a method (shown generally as 800 in FIG. 8) of reconfiguring a stream process in a distributed system in accordance with an embodiment of the present disclosure. In step 810, a stream process (e.g., stream process 600 shown in FIG. 6) is managed. The stream process includes one or more operators (e.g., operators 610, 611, 612, 613 and 614 shown in FIG. 6). The one or more operators may be communicatively associated with one or more stream targets. In some embodiments, stream targets may include one or more operators, data sources (e.g., source 623 shown in FIG. 6) and/or stream output sinks (e.g., sink 624 shown in FIG. 6). The operator(s) may use a partition function (e.g., partition function 605a shown in FIG. 6) to determine the routing of messages to the one or more stream targets.

In some embodiments, the one or more operators may span a batch window over multiple batches, and the partition function of the operator(s) may be configured with an old partition function and a new partition function. In some embodiments, the operator partitions a result of an operator function (e.g., operator function 603a shown in FIG. 6) according to the old partition function and the new partition function until all batches partitioned according to the old partition function spanned by the batch window have been transmitted. In some embodiments, the operator(s) may transmit batches partitioned according to the old partition function and the new partition function based on a time period derived from the batch window size.

In step 820, a safe state within the stream process is determined.

In step 830, a configuration state of the one or more operators is configured during the safe state. In some embodiments, the configuration state may be provided as a data stream within the stream process. The configuration state may additionally, or alternatively, be multiplexed with a data stream within the stream process. The configuration state may be stored for use in the recovery of one or more operators, e.g., in case of a failure of any of the operators.

In some embodiments, the operator(s) may be removed from the stream process by configuration of an operator dataflow of the operator(s) of the stream process. The operator(s) of the stream process may use an acknowledgement protocol to upstream operators to determine when the operator(s) can be safely shut down. The operator(s) of the stream process may communicate with a controller process to shut down the operator(s).

The presently-disclosed method of reconfiguring a stream process in a distributed system may additionally include the step of transmitting a combined data stream from one or more sending operators to one or more receiving operators partitioned according to the old partition function and the new partition function, wherein the receiving operator(s) may filter the combined data stream according to either the old partition function or the new partition function of the sending operator(s). The presently-disclosed method of reconfiguring a stream process in a distributed system may additionally, or alternatively, include the steps of instantiating one or more new operators, and integrating the new operator(s) into the stream process by configuring an operator dataflow of the operator(s) of the stream process.

Figure 9:
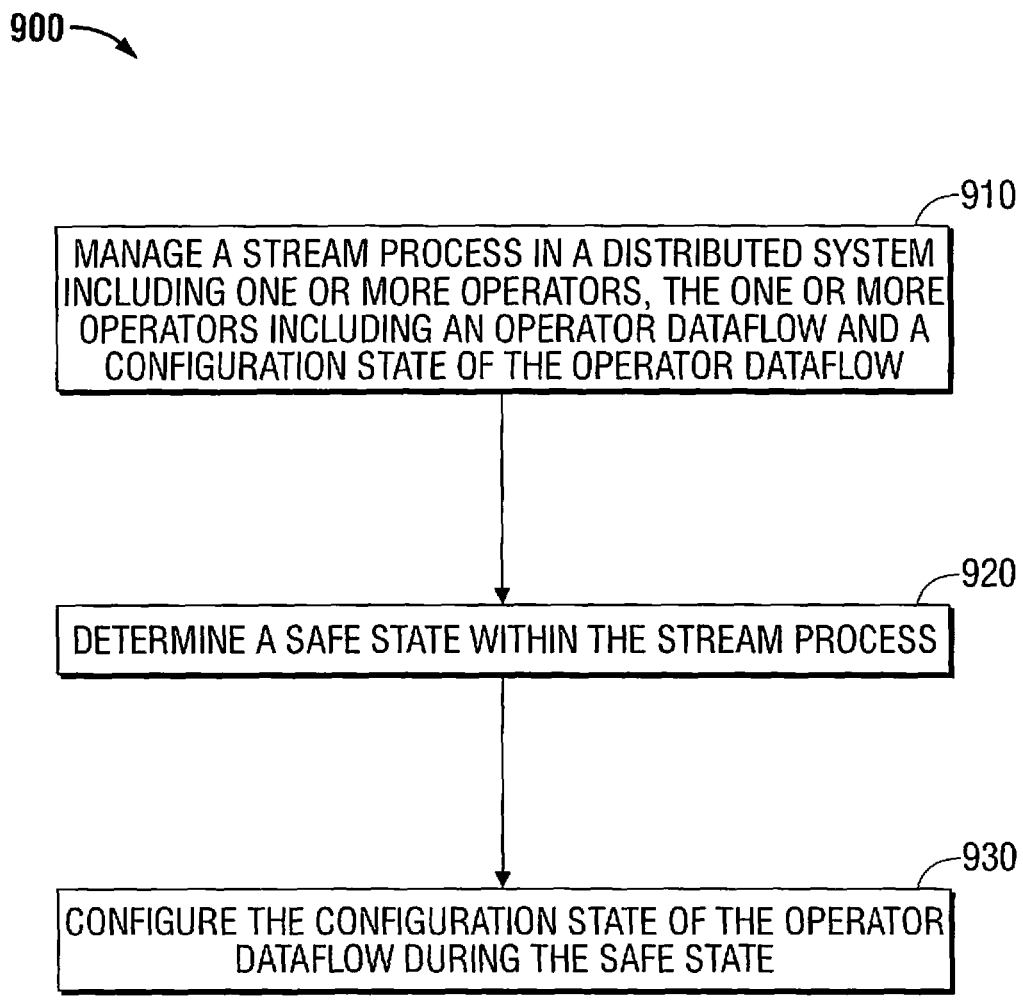
FIG. 9 is a flowchart illustrating a method for management of a stream processing system in accordance with an embodiment of the present disclosure.

FIG. 9 is a flowchart illustrating a method (shown generally as 900 in FIG. 9) for management of a stream processing system in accordance with an embodiment of the present disclosure. In step 910, a stream process in a distributed system is managed. The stream process includes one or more operators (e.g., operators 510, 511, 512, 513 and 514 shown in FIG. 5). The one or more operators each include an operator dataflow 210 (FIG. 2) and a configuration state 204 of the operator dataflow 210.

In step 920, a safe state within the stream process is determined.

In step 930, the configuration state 204 of the operator dataflow 210 is configured during the safe state. In some embodiments, the operator dataflow 210 includes an input connector 201 for receiving messages. The operator dataflow 210 may additionally, or alternatively, include an output connector for sending messages. The operator dataflow 210 may additionally, or alternatively, include a de-multiplexer for dividing a combined data stream into sub-streams. The operator dataflow 210 may additionally, or alternatively, include an operator function for performing data transformation and/or computation. The operator dataflow 210 may additionally, or alternatively, include a partition function for performing message routing.

In step 930, an internal state of the one or more operators is configured during the safe state. In some embodiments, the safe state is defined as a state between the processing of two batches having different identifiers from one another. The values of the identifiers of the two batches may be either monotonically increasing or monotonically decreasing. In some embodiments, the two batches may be two consecutive batches.

Although embodiments have been described in detail with reference to the accompanying drawings for the purpose of illustration and description, it is to be understood that the inventive processes and systems are not to be construed as limited thereby. It will be apparent to those of ordinary skill in the art that various modifications to the foregoing embodiments may be made without departing from the scope of the disclosure.

What is claimed is:

1. A method of reconfiguring a stream process in a distributed system, the method comprising the steps of:
    managing the stream process including at least one operator, the at least one operator communicatively associated with at least one stream target, the at least one operator using a partition function to determine the routing of messages to the at least one stream target;
    determining a safe state within the stream process; and
    configuring a configuration state of the at least one operator during the safe state,
    wherein the at least one operator spans a batch window over multiple batches and the partition function of the at least one operator is configured with an old partition function and new partition function, and
    wherein the at least one operator transmits batches partitioned according to the old partition function and the new partition function based on a time derived from a size of the batch window.

2. The method of claim 1, wherein the configuration state is multiplexed with a data stream within the stream process.

3. The method of claim 1, wherein the safe state is defined as a state between the processing of two batches having different identifiers from one another.

4. The method of claim 3, wherein the values of the identifiers of the two batches are monotonically increasing or monotonically decreasing.

5. The method of claim 1, wherein the at least one operator partitions a result of an operator function according to the old partition function and the new partition function until all batches partitioned according to the old partition function spanned by the batch window have been transmitted.

6. The method of claim 1, further comprising the step of:
    transmitting a combined data stream from a sending operator to at least one receiving operator partitioned according to the old partition function and the new partition function, wherein the at least one receiving operator filters the combined data stream according to the at least one sending operator's old partition function or new partition function.

7. The method of claim 1, further comprising the steps of:
    instantiating at least one new operator; and
    integrating the at least one new operator into the stream process by configuring an operator dataflow of the at least one operator of the stream process.

8. The method of claim 7, wherein at least one of the at least one new operator is launched in an un-configured state and configured at runtime.

9. The method of claim 7, wherein the operator dataflow includes an input connector for receiving messages and an output connector for sending messages.

10. The method of claim 7, wherein the operator dataflow includes a de-multiplexer for dividing a combined data stream into sub-streams.

11. The method of claim 7, wherein the operator dataflow includes an operator function for performing data transformation or computation.

12. The method of claim 7, wherein the operator dataflow includes a partition function for performing message routing.

13. The method of claim 1, wherein at least one of the at least one operator is removed from the stream process by configuration of an operator dataflow of the at least one operator of the stream process.

14. The method of claim 1, wherein the at least one operator uses an acknowledgement protocol to one or more upstream operators to determine when the at least one operator can be safely shut down.

15. The method of claim 1, wherein the at least one operator communicates with a controller process to shut down the at least one operator.

16. The method of claim 1, wherein the configuration state is provided as a data stream within the stream process.

17. The method of claim 16, wherein the configuration state is stored for recovering of at least one operator in case of a failure.

18. A method for management of a stream processing system, the method comprising the steps of:

managing the stream process in a distributed system including at least one operator, the at least one operator including an operator dataflow and a configuration state of the operator dataflow;

determining a safe state within the stream process; and configuring the configuration state of the operator dataflow during the safe state, wherein the at least one operator spans a batch window over multiple batches and a partition function of the at least one operator is configures with an old partition function and a new partition function, and wherein the at least one operator transmits batches partitioned according to the old partition function and the new partition function based on a time derived from a size of the batch window.

19. A method of reconfiguring a stream process in a distributed system, the method comprising the steps of:

managing the stream process including at least one operator, the at least one operator communicatively associated with at least one stream target, the at least one operator using a partition function to determine routing of messages to the at least one stream target;

determining a safe state within the stream process; and configuring a configuration state of the at least one operator during the safe state, wherein the at least one operator spans a batch window over multiple batches and the partition function of the at least one operator is configured with an old partition function and a new partition function, wherein the at least one operator partitions a result of an operator function according to the old partition function and the new partition function until all batches partitioned according to the old partition function spanned by the batch window have been transmitted, and wherein the at least one operator transmits batches partitioned according to the old partition function and the new partition function based on a time derived from a size of the batch window.

* * * * *